US008728647B2

(12) United States Patent
Bergevin et al.

(10) Patent No.: US 8,728,647 B2
(45) Date of Patent: May 20, 2014

(54) CLICK-ON DECORATIVE ELEMENTS

(75) Inventors: Louis Bergevin, Notre-Dame de l'Ile-Perrot (CA); Yvan Bergevin, Vaudreuil (CA); Annie Lajeunesse, Hudson (CA)

(73) Assignee: Systèmes Nuco Inc/Nuco Systems, Notre-Dame de l'Ile Perrot, QC (CA)

(*) Notice: Subject to any disclaimer, the term of this patent is extended or adjusted under 35 U.S.C. 154(b) by 327 days.

(21) Appl. No.: 12/896,477

(22) Filed: Oct. 1, 2010

(65) Prior Publication Data

US 2012/0082878 A1 Apr. 5, 2012

(51) Int. Cl.
*B32B 3/06* (2006.01)

(52) U.S. Cl.
USPC ................................ 429/99; 428/192; 428/57

(58) Field of Classification Search
USPC ............................................. 428/99, 192, 57
See application file for complete search history.

(56) References Cited

U.S. PATENT DOCUMENTS

| | | | | |
|---|---|---|---|---|
| 5,348,066 | A | 9/1994 | Wilson | |
| 6,134,854 | A | 10/2000 | Stanchfield | |
| 7,793,483 | B2 | 9/2010 | Stanchfield et al. | |
| 2007/0283654 | A1* | 12/2007 | Stanchfield et al. | ............ 52/465 |
| 2008/0066419 | A1 | 3/2008 | Stanchfield | |

FOREIGN PATENT DOCUMENTS

| | | | |
|---|---|---|---|
| CA | 2244865 | A | 8/1997 |
| CA | 2712099 | Y | 9/2009 |
| CN | 101235935 | A | 5/2008 |
| FR | 2760481 | A | 9/1998 |

* cited by examiner

*Primary Examiner* — Jane Rhee
(74) *Attorney, Agent, or Firm* — Benoît & Côté inc.

(57) ABSTRACT

The present document describes a surface mounting element for receiving a decorative element comprising: a portion for fixedly interfacing with said surface; and a mating connector for releasably connecting to a corresponding mating connector of the decorative element. The present document also describes a decorative element, a decorative adjustment element, decorative assembly kit and a decorative frame assembly and any combinations thereof.

10 Claims, 11 Drawing Sheets

CLICK-ON DECORATIVE ELEMENTS

BACKGROUND (a) Field

This invention relates to the field of building materials. More particularly, it relates to decorative elements applied to surfaces and the methods for installing the same.

(b) Related Prior Art

Typically, when a home is having its floor covering replaced, all wall base decorative element usually remains fastened to the walls because it matches existing wall base decorative element throughout the home. As it is noticed, replacing the wall base decorative element is not only expensive, it may also require refinishing the walls where the wall base decorative elements are attached. When a finished decorative element, or molding, is required at the edge of finished flooring where it meets the wall base, decorative elements, or moldings may typically be installed.

As an example, U.S. Pat. No. 7,793,483 discloses round molding, or shoe molding. However, the disclosed molding, or decorative element, does not provide a juxtaposition of the molding on the surface which is receiving the molding.

For those disadvantages, there is still a need in the field of building materials for decorative elements applied to surfaces and methods for installing decorative elements to different surfaces.

SUMMARY

It is an object of the present disclosure to provide a surface mounting element for receiving a decorative element comprising:

a portion for fixedly interfacing with the surface; and a mating connector for releasably connecting to a corresponding mating connector of the decorative element.

According to one embodiment of the present disclosure, there is provided a decorative element to be installed on a surface mounting element fixedly attached to a surface, the decorative element comprising:

a decorative external face; and a mating connector for releasably connecting to a corresponding mating connector of the surface mounting element.

The decorative element may further comprise:

two opposite ends, each end having a fastener for releasably engaging with a corresponding fastener on an adjacent decorative element.

According to another embodiment of the present disclosure, there is provided a decorative element for receiving a decorative adjustment element, the decorative element further comprising:

an other mating connector for releasably connecting to a corresponding mating connector of the decorative adjustment element.

According to another embodiment of the present disclosure, there is provided a decorative adjustment element to be installed on a decorative element, the decorative adjustment element comprising:

a decorative external face;

two opposite ends, each end having a fastener for releasably engaging with a corresponding fastener on an adjacent decorative adjustment element.

The decorative adjustment element may further comprise:

two opposite ends, each end having a fastener for releasably engaging with a corresponding fastener on an adjacent decorative adjustment element.

According to another embodiment of the present disclosure, there is provided a decorative assembly kit to be installed on a surface, the decorative assembly kit comprising:

a surface mounting element for receiving a decorative element comprising a portion for fixedly interfacing with the surface; and a mating connector for releasably connecting to a corresponding mating connector of the decorative element;

decorative element to be installed on the surface mounting element fixedly attached to a surface, the decorative element comprising a decorative external face; and a mating connector for releasably connecting to a corresponding mating connector of the surface mounting element fixedly attached to the surface; and a decorative adjustment element to be installed on the decorative element, the decorative adjustment element comprising: a decorative external face; and a mating connector for releasably coupling to a corresponding mating connector of the decorative element.

According to another embodiment of the present disclosure, there is provided a decorative assembly kit for receiving a decorative adjustment element, the decorative element further comprising:

a mating connector for releasably connecting to a corresponding mating connector of the decorative adjustment element.

According to another embodiment of the present disclosure, there is provided a decorative frame assembly kit for at least partially framing an opening in a structure having a thickness, the decorative frame assembly kit comprising:

at least two longitudinal edge mounting elements comprising a longitudinal axis wherein at least one of the at least two longitudinal edge mounting elements comprises a decorative external face;

the at least two longitudinal edge mounting elements for at least partially releasably framing the opening by adjustably coupling together along the longitudinal axis to adjust to said thickness.

According to another embodiment of the present disclosure, there is provided a decorative frame assembly kit, wherein said structure comprises an internal surface defining said thickness; and wherein at least one of said longitudinal edge mounting elements for fixedly interfacing with said internal surface.

According to another embodiment of the present disclosure, there is provided a decorative frame assembly kit, wherein at least one of said longitudinal edge mounting element further comprises:

a longitudinally extending portion for fixedly interfacing with said internal surface.

According to another embodiment of the present disclosure, there is provided a decorative frame assembly kit, wherein said at least two longitudinal edge mounting elements comprise two opposite ends, each end having a fastener for releasably engaging with a corresponding fastener on an adjacent longitudinal edge mounting element.

According to another embodiment of the present disclosure, there is provided a decorative frame assembly kit for receiving a decorative longitudinal capping element, wherein at least one of said longitudinal edge mounting element further comprises:

a mating connector adjacent to said longitudinally extending portion for releasably connecting to a corresponding mating connector of the decorative longitudinal capping element.

According to another embodiment of the present disclosure, there is provided a decorative frame assembly kit wherein at least one of said longitudinal edge mounting elements is formed of two parts connected together with corresponding mating connectors near an edge of the internal surface.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In embodiments there are disclosed building materials. More particularly, the embodiments relates to decorative elements applied to surfaces and the methods for installing the same.

Figure 1:
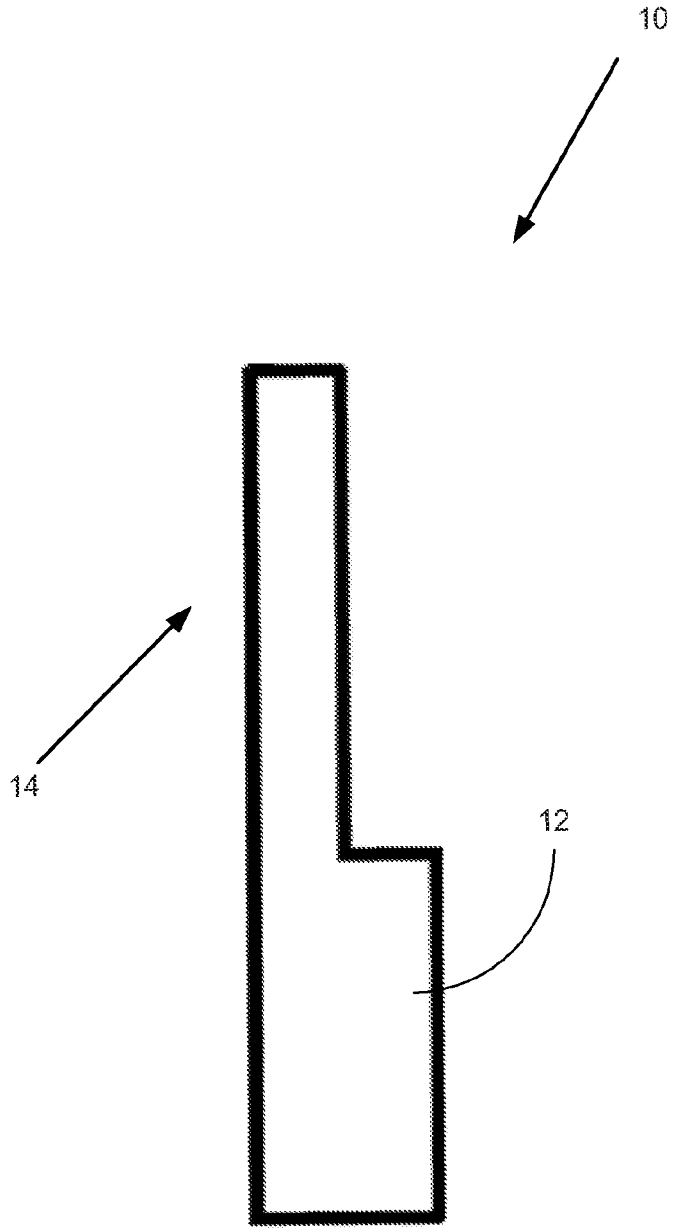
FIG. 1 illustrates a cross-sectional view of one embodiment of a surface mounting element.

Referring now to the drawings, and more particularly to FIG. 1, there is shown an embodiment of a surface mounting element 10. The surface mounting element 10 may include a portion 12 for fixedly interfacing with the surface and a mating connector 14 for releasably connecting to a corresponding mating connector 28 of a decorative element 20.

Figure 2:
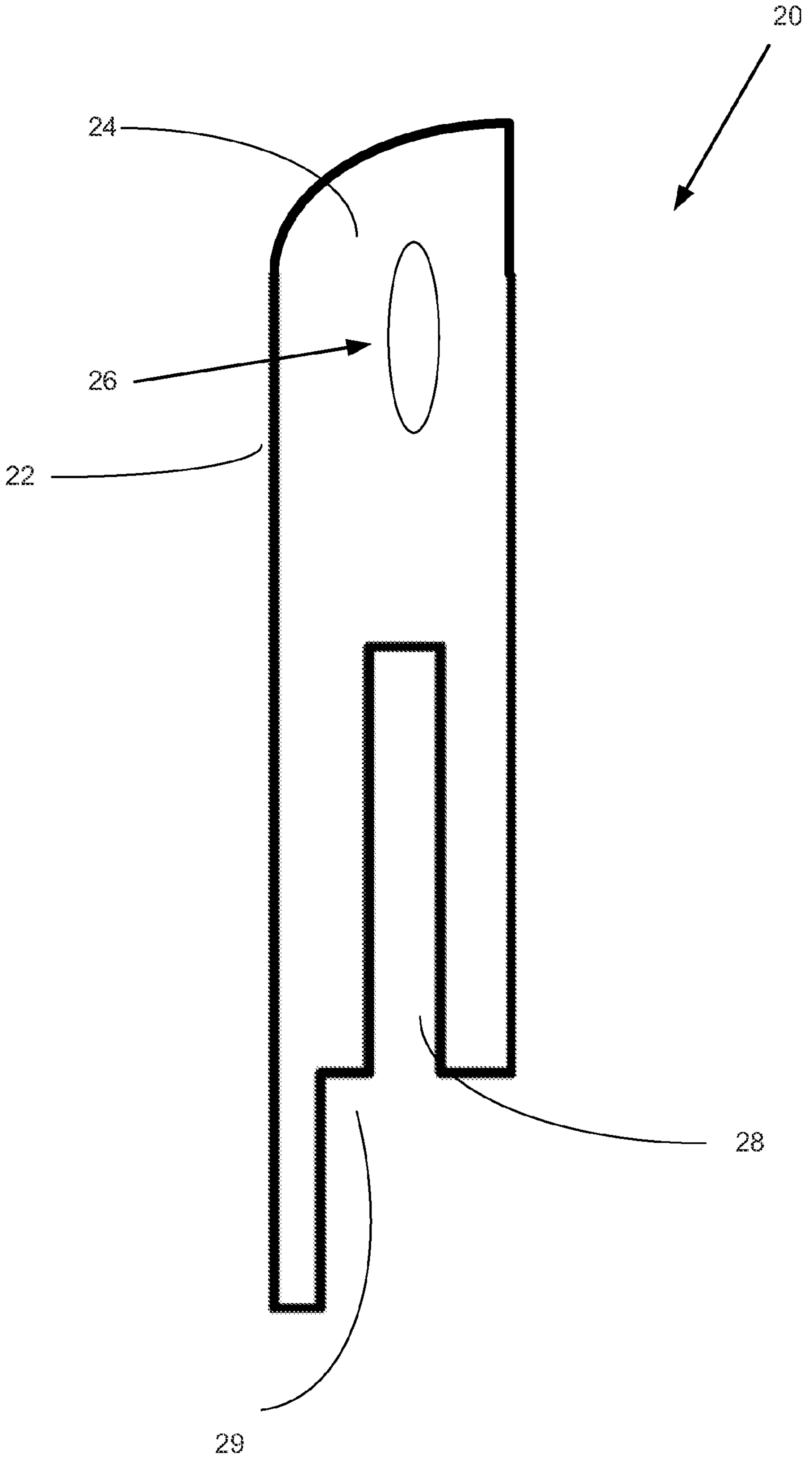
FIG. 2 illustrates a cross-sectional view of one embodiment of a decorative element.

Now referring to FIG. 2, there is shown an embodiment of a decorative element 20 to be installed on a surface. The decorative element 20 may include a decorative external face 22, two opposite ends 24, each end having a fastener 26 for releasably engaging with a corresponding fastener 26 on an adjacent decorative element 20, a mating connector 28 for releasably connecting to a corresponding mating connector 14 of a surface mounting element 10 fixedly attached to the surface and a mating connector 29 for releasably connecting to a corresponding mating connector 38 of a decorative adjustment element 30.

Figure 3:
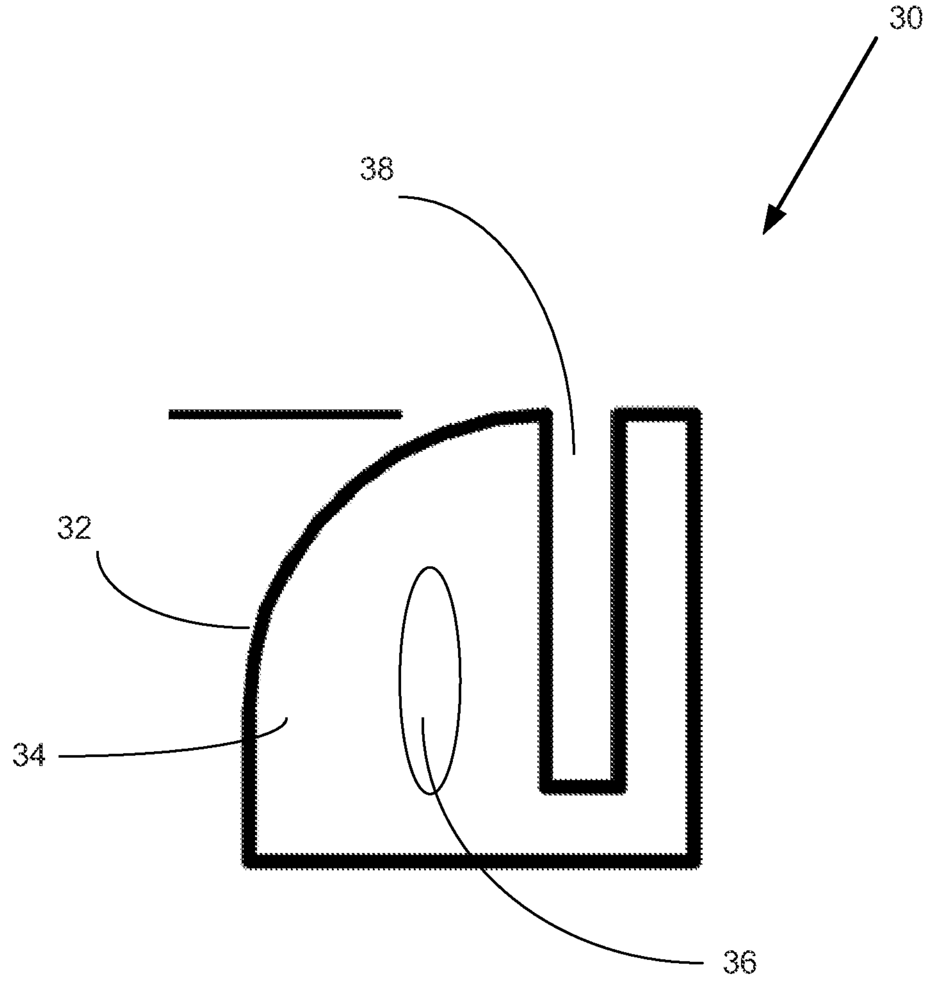
FIG. 3 illustrates a cross-sectional view of one embodiment of a decorative adjustment element.

Now referring to FIG. 3, there is shown an embodiment of a decorative adjustment element 30 to be installed on a decorative element 20. The decorative adjustment element 30 may include a decorative external face 32, two opposite ends 34, each end 34 having a fastener 36 for releasably engaging with a corresponding fastener 36 on an adjacent decorative adjustment element 30 and a mating connector 38 for releasably coupling to a corresponding mating connector 28 of a decorative element 20.

Figure 4:
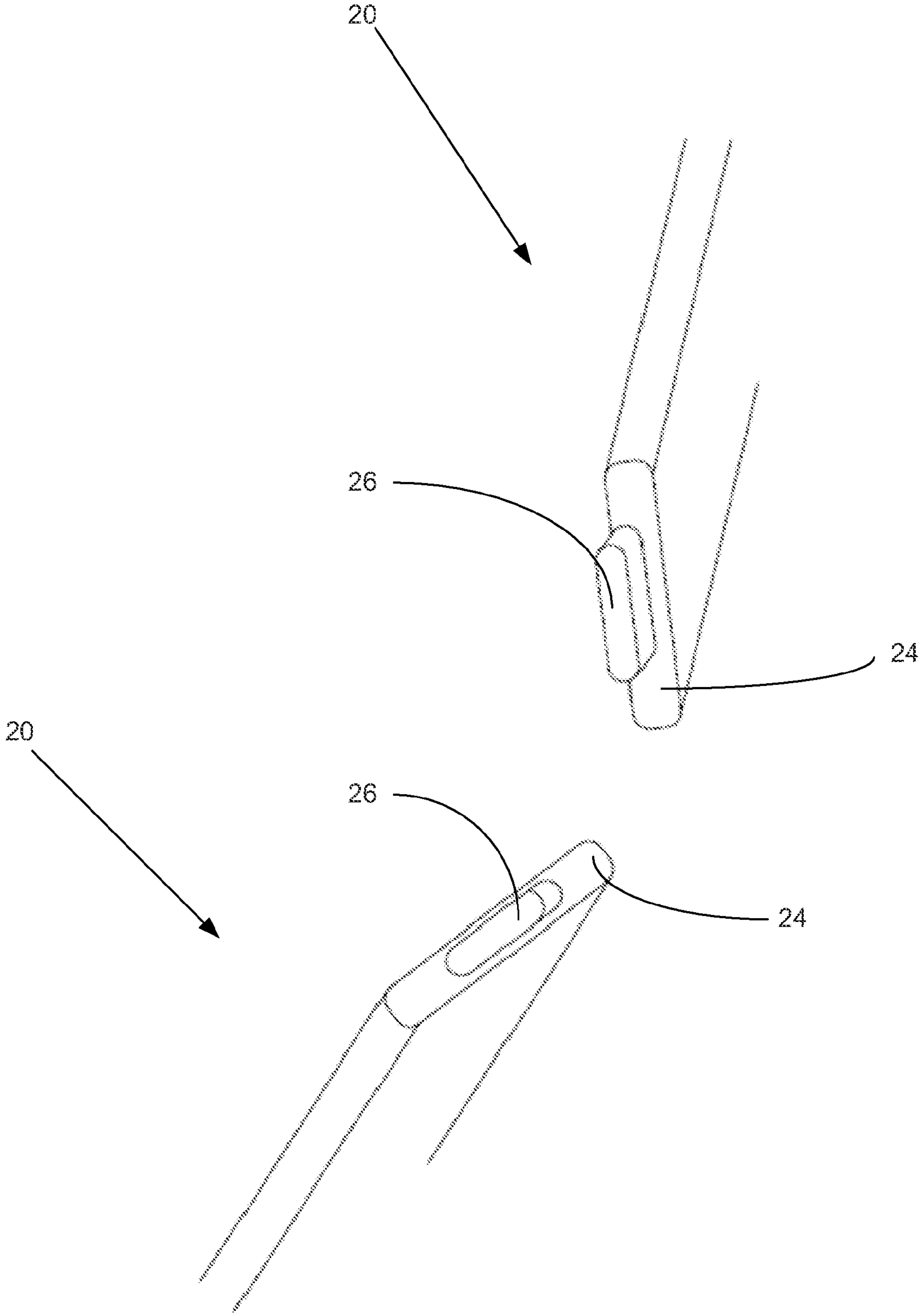
FIG. 4 illustrates corresponding fasteners of a decorative element.

Now referring to FIG. 4, there is shown a decorative element 20 which may include a decorative external face 22, two opposite ends 24, each end having a fastener 26 for releasably engaging with a corresponding fastener 26 on an adjacent decorative element 20.

Figure 5:
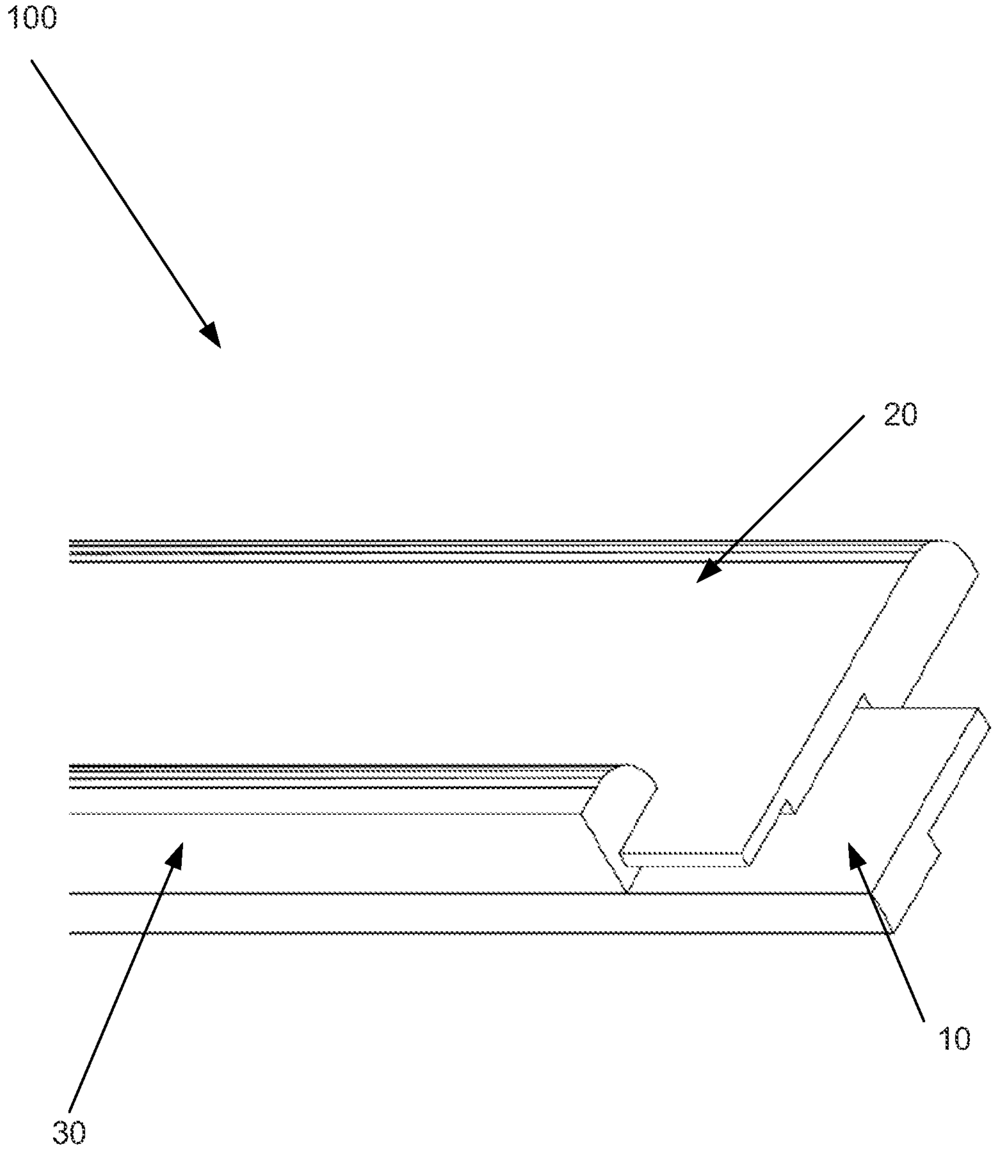
FIG. 5 illustrates a decorative assembly kit to be installed on a surface.
Figure 8:
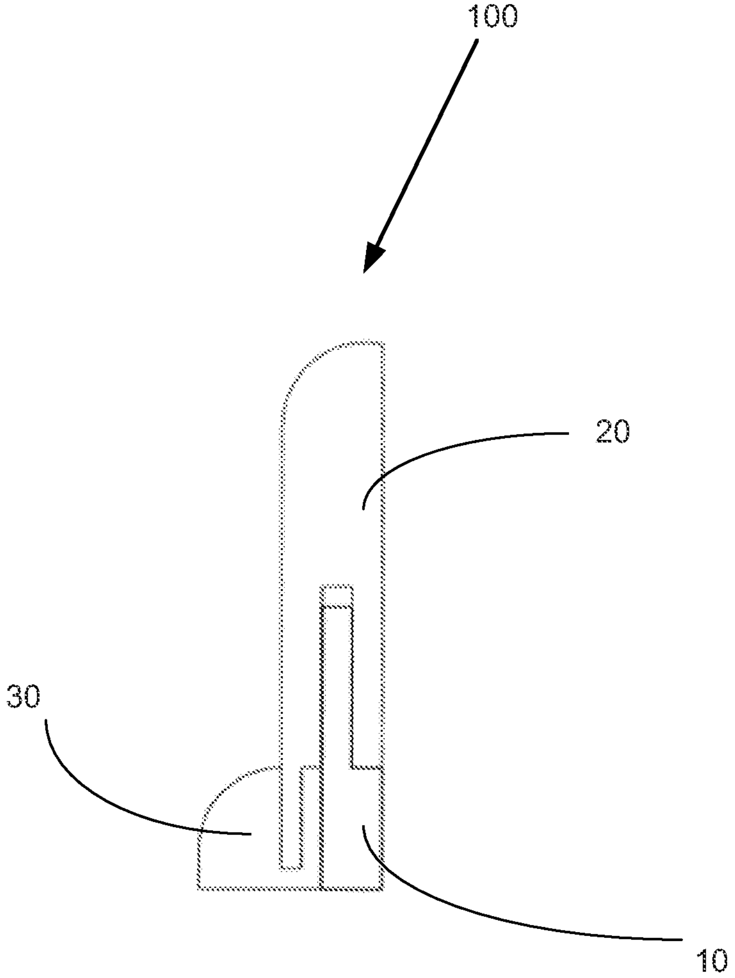
FIG. 8 illustrates a cross sectional view of a decorative assembly kit to be installed on a surface.

Now referring to FIGS. 5 and 8, in another embodiment, there is provided a decorative assembly kit 100 to be installed on a surface, the decorative assembly kit may include:

a surface mounting element 10 which may include a portion 12 for fixedly interfacing with the surface and a mating connector 14 for releasably connecting to a corresponding mating connector 28 of a decorative element 20;

a decorative element 20 to be installed on a surface, the decorative element may include a decorative external face 22; two opposite ends 24, each end 24 having a fastener 26 for releasably engaging with a corresponding fastener 26 on an adjacent decorative element 20, a mating connector 28 for releasably connecting to a corresponding mating connector 14 of a surface mounting element 10 fixedly attached to the surface; and a mating connector 29 for releasably connecting to a corresponding mating connector 38 of a decorative adjustment element 30;

a decorative adjustment element 30 to be installed on a decorative element 20, the decorative adjustment element 30 may include a decorative external face 32, two opposite ends 34, each end 34 having a fastener 36 for releasably engaging with a corresponding fastener 36 on an adjacent decorative adjustment element 30 and a mating connector 38 for releasably coupling to a corresponding mating connector 28 of a decorative element 20.

Figure 6A:
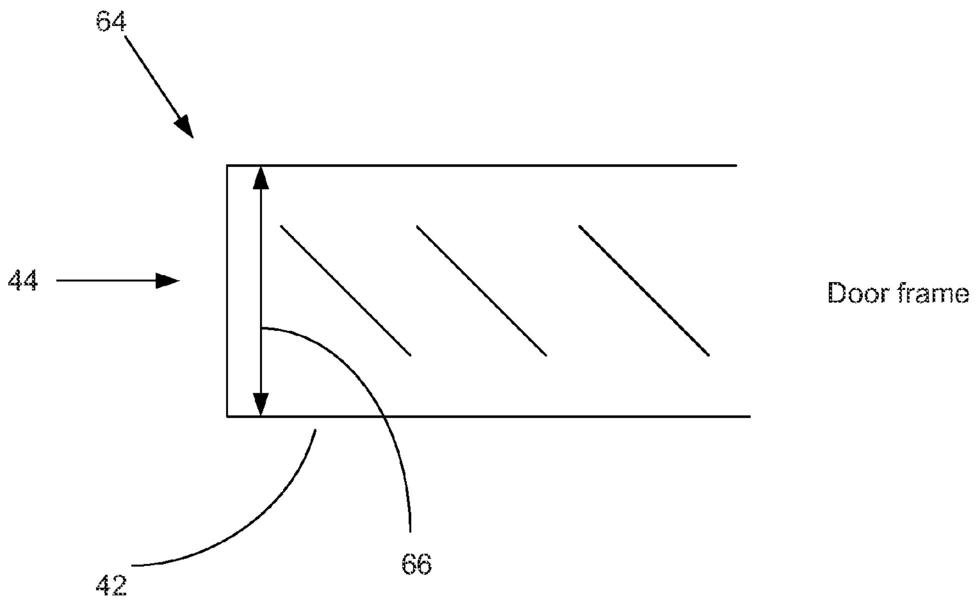
FIG. 6A illustrates a cross sectional view of a door frame.

Now referring to FIG. 6A, there is shown a cross sectional view of a door frame defining an opening. The opening is in a structure defining a peripheral external surface 42 and an internal surface 44 of longitudinal length (not shown) and a lateral length 44 (aka a thickness of the structure). Edge 64 is at a meeting point of the peripheral external surface 42 with the internal surface 44.

Figure 6B:
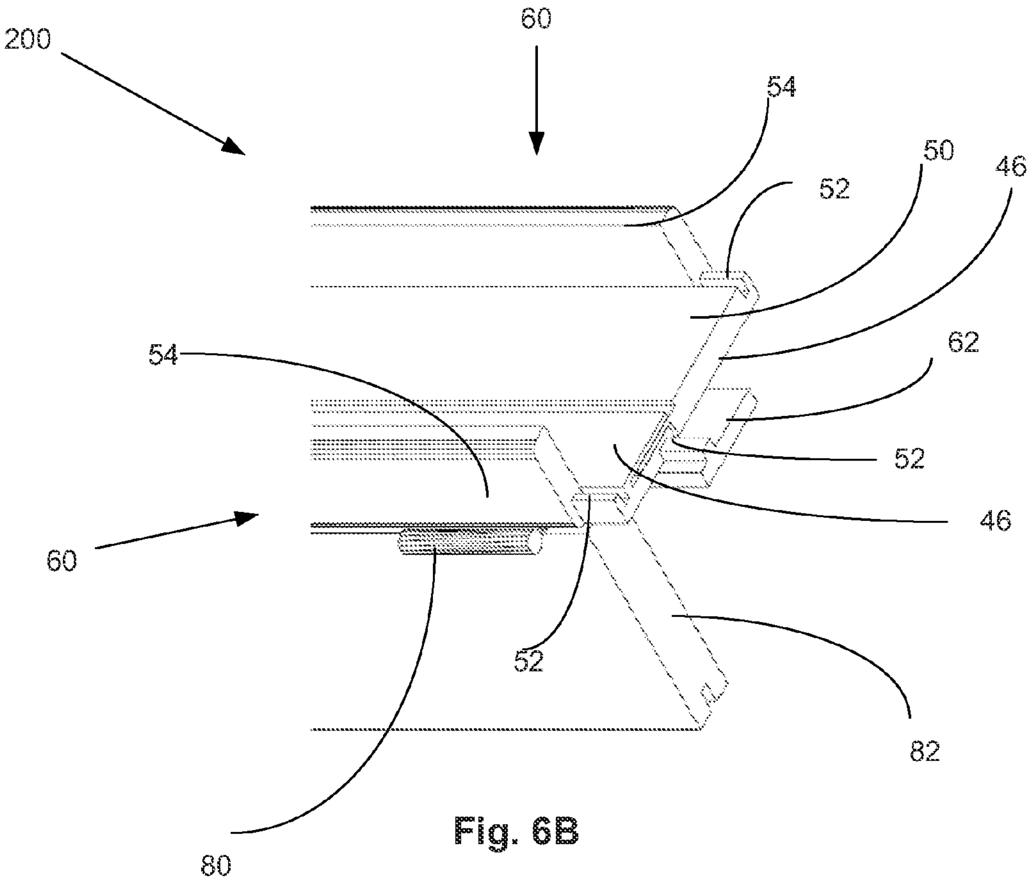
FIG. 6B illustrates a decorative frame assembly kit to be installed at least partially around an opening in a structure.
Figure 7:
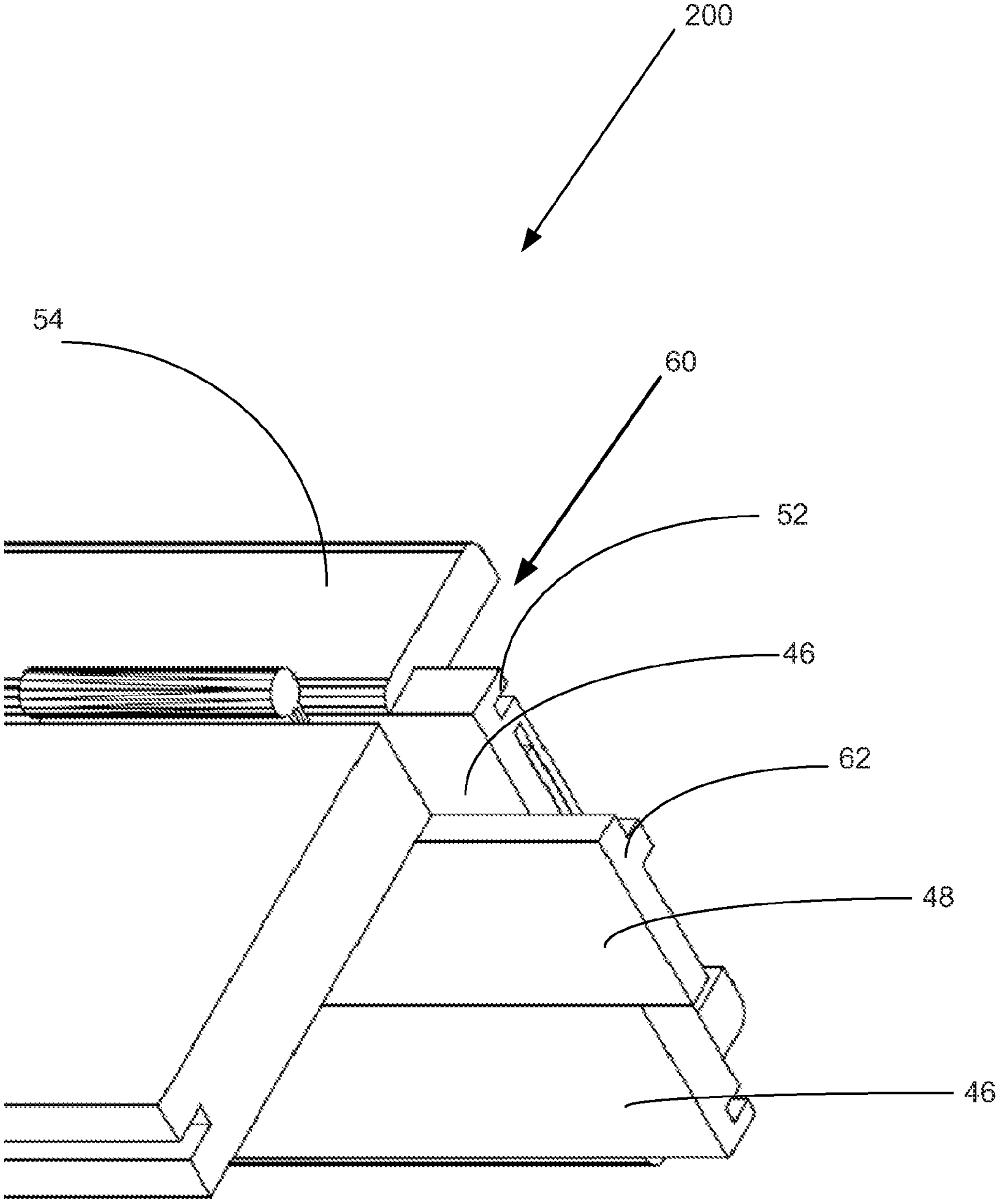
FIG. 7 illustrates another view of decorative frame assembly kit to be installed at least partially around an opening in a structure.
Figure 9:
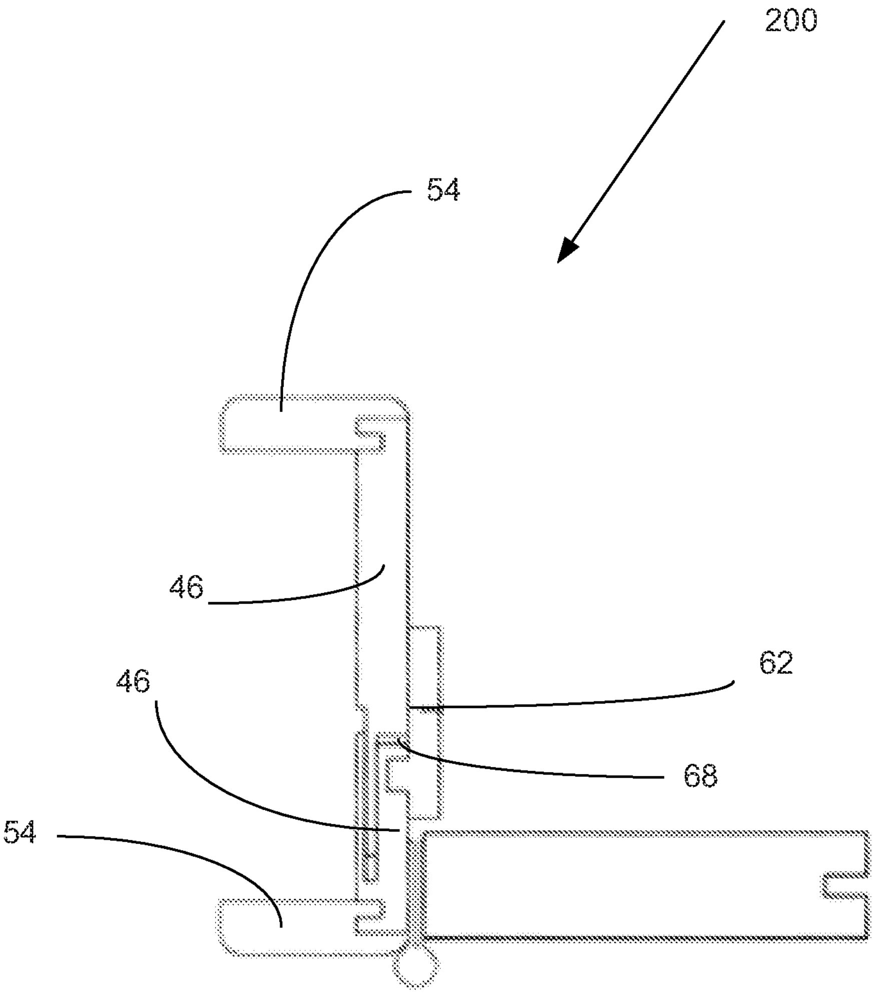
FIG. 9 illustrates a cross-sectional view of decorative frame assembly kit to be installed at least partially around an opening in a structure.

Now referring to FIGS. 6B, 7, and 9, there is shown an embodiment of a decorative frame assembly kit 200 to be installed around an opening in a structure defining a peripheral external surface 42 and an internal surface 44 of longitudinal and lateral lengths. The decorative frame assembly kit may further include:

at least two opening internal surface mounting elements 46 coupling together along a longitudinal axis to adjust to the lateral length of the opening internal surface 44, the mounting elements comprising:

a decorative external face 48;

a longitudinally extending portion 50 on at least one of the opening internal surface mounting elements 46 for fixedly interfacing with the opening internal surface 44; and a mating connector 52 on at least one of the opening internal surface mounting elements adjacent to the longitudinally extending portion 50 for releasably connecting to a corresponding mating connector 52 of a decorative longitudinally extending frame element 54;

a mating connector 52 adjacent to the opening peripheral external surface 42 for releasably connecting to a corresponding mating connector 52 of a decorative peripheral frame element;

a decorative longitudinally extending frame element 54 having a decorative external face 48 and a mating connector 52 for releasably connecting to a corresponding mating connector 52 of at least one opening internal surface mounting elements 46 to decoratively cover the longitudinally extending portion 50; and a decorative peripheral frame element 56 to be installed on the peripheral external surface 42 of the opening, comprising a decorative external face 48; and a mating connector 52 for releasably connecting to a corresponding mating connector 52 of at least one of the opening internal surface mounting elements 46;

wherein each of the decorative elements opposite ends having a fastener 58 for releasably engaging with a corresponding fastener 58 on an adjacent decorative element.

Still according to FIG. 6B, there is also a door 82 held be a hinge 80 to one of the opening internal surface mounting elements 46.

In another embodiment, there is shown a decorative assembly kit of for receiving a decorative adjustment element, the decorative element may further include a mating connector 52 for releasably connecting to a corresponding mating connector 52 of the decorative adjustment element.

In another embodiment, there is shown a decorative frame assembly kit to be installed at least partially around an opening in a structure defining a peripheral external surface 42, an internal surface of longitudinal and lateral lengths, and an edge at a meeting point of the peripheral external surface 42 with the internal surface, the decorative frame assembly kit may include:

at least two longitudinal edge mounting elements 60 to releasably frame at least partially the external and internal surfaces of the opening, where the longitudinal edge mounting elements adjustably coupling together along a longitudinal axis to adjust to the lateral length of the opening internal surface 44, where at least one of the longitudinal edge mounting elements 60 fixedly interfacing with the internal surface 44, the longitudinal edge mounting element 60 may include:

a decorative external face 48;

two opposite ends, each end having a fastener 58 for releasably engaging with a corresponding fastener 58 on an adjacent longitudinal edge mounting element 60.

In another embodiment, there is shown a decorative frame assembly where at least one of the longitudinal edge mounting element 60 may further include:

a longitudinally extending portion 50 for fixedly interfacing with the opening internal surface 44.

In another embodiment, there is shown a decorative frame assembly for receiving a decorative longitudinal capping element, where at least one of the longitudinal edge mounting element 60 may further include:

a mating connector 52 adjacent to the longitudinally extending portion 50 for releasably connecting to a corresponding mating connector 52 of a decorative longitudinal capping element.

In another embodiment, there is shown a decorative frame assembly kit, where at least one of the longitudinal edge mounting element 60 is formed of two parts connected together at the edge with corresponding mating connectors 52.

Figure 10:
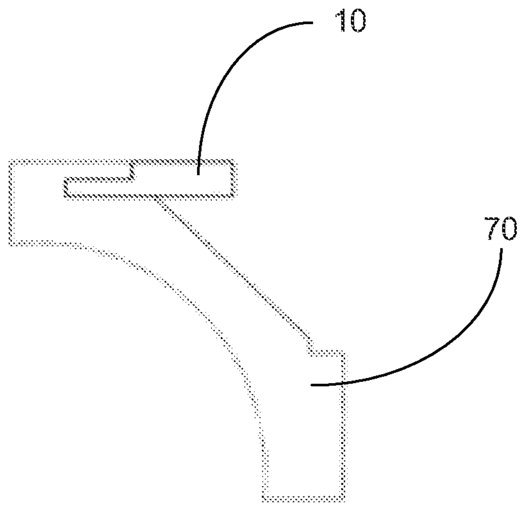
FIG. 10 illustrates a cross-sectional view of one embodiment of a surface mounting element installed on a horizontal surface.

Now referring to FIG. 10, there is illustrated a cross-sectional view of one embodiment of a surface mounting element 10 installed on a horizontal surface (e.g., a ceiling). This embodiment is useful when installing a decorative element 70 that hides the joint between the ceiling and a wall.

Figure 11:
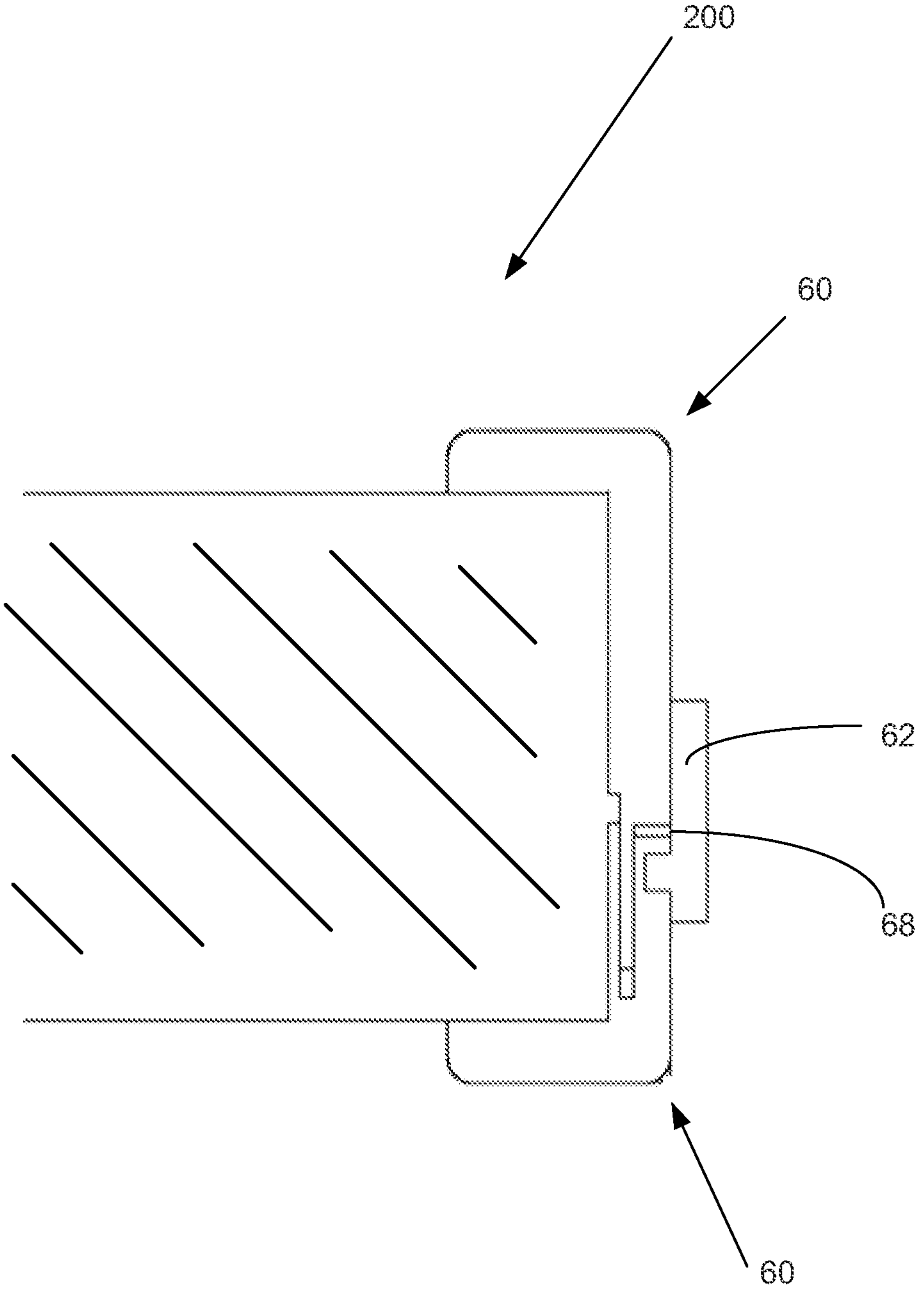
FIG. 11 illustrates a cross-sectional view of one embodiment of a decorative frame assembly kit to be installed at least partially around an opening in a structure.

Now referring to FIG. 11, there is illustrated a cross-sectional view of a decorative frame assembly kit to be installed at least partially around an opening in a structure. According to this embodiment, there is shown a decorative frame assembly kit 200 for at least partially framing an opening in a structure having a thickness. The decorative frame assembly kit 200 comprises at least two longitudinal edge mounting elements 60 comprising a longitudinal axis 68 wherein at least one of the at least two longitudinal edge mounting elements comprises a decorative external face; the at least two longitudinal edge mounting elements for at least partially releasably framing the opening by adjustably coupling together along the longitudinal axis to adjust to the thickness. One of the two longitudinal edge mounting elements 60 is made for receiving a decorative longitudinal capping element 62

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A molding decorative element for installation on a wall surface at an edge of the wall surface and a floor surface the molding decorative element comprising:

a wall surface mounting element for mounting on the wall surface parallel to the edge defined by the wall surface and the floor surface and adjacent to the floor surface, the wall surface mounting element comprising:

an elongated portion for fixedly interfacing with the wall surface, the elongated portion having a first end, a second end and a longitudinal axis separating the first end and the second end, the elongated portion having an upper edge extending between the first end and the second end;

the upper edge comprising a surface mounting element mating connector for releasably connecting to a decorative element mating connector;

a wall decorative element releasably mounted on the wall surface mounting element fixedly mounted on the wall surface, the wall decorative element comprising:

a decorative elongated portion having a decorative first end, a decorative second end and a decorative longitudinal axis separating the decorative first end and the decorative second end, the decorative elongated portion having a lower edge extending between the decorative first end and the decorative second end capable of interfacing with the floor surface; and the decorative element mating connector releasably connected to the surface mounting element mating connector of the wall surface mounting element;

wherein when the wall decorative element is releasably mounted on the wall surface mounting element fixed mounted on the wall surface, at least a portion of the decorative elongated portion of the wall decorative element interfaces with the wall surface; and further wherein the surface mounting element mating connector of the wall surface mounting element and the decorative element mating connector of the wall decorative element extend perpendicularly along the longitudinal axis and the decorative longitudinal axis respectively for allowing a releasable connection between the mounting element mating connector and the decorative element mating connector in a direction perpendicular to the longitudinal axis of the elongated portion and the decorative longitudinal axis of the decorative elongated portion and parallel to the wall surface.

2. The molding decorative element of claim 1, wherein the wall decorative element further comprises a decorative external face.

3. The molding decorative element of claim 1, wherein the wall decorative element further comprises a first fastener at the first end and a second fastener at the second end for releasably engaging with corresponding fasteners on adjacent wall decorative elements.

4. The molding decorative element of claim 1, further comprising a wall decorative adjustment element releasably connected to the wall decorative element releasably mounted on the wall surface mounting element, wherein the wall decorative element further comprises another decorative element mating connector releasably connected to a corresponding adjustment decorative element mating connector of the wall decorative adjustment element.

5. The molding decorative element of claim 4, wherein the wall decorative adjustment element further comprises a decorative external face.

6. The molding decorative element of claim 5, wherein the wall decorative adjustment element further comprises a first fastener at a first end of the wall decorative adjustment element and a second fastener at a second end of the wall decorative adjustment element, wherein the releasably engaging with corresponding fasteners on adjacent wall decorative adjustment elements.

7. A molding decorative assembly kit to be installed on a wall surface at an edge of the wall surface and a floor surface, the molding decorative assembly kit comprising:

a wall surface mounting element for mounting on the wall surface parallel to the edge defined by the wall surface and the floor surface and adjacent to the floor surface, the wall surface mounting element comprising:

an elongated portion for fixedly interfacing with the wall surface, the elongated portion having a first end, a second end and a longitudinal axis separating the first end and the second end, the elongated portion having an upper edge extending between the first end and the second end;

the upper edge comprising a surface mounting element mating connector for releasably connecting to a decorative element mating connector;

a wall decorative element to be releasably mounted on the wall surface mounting element to be fixedly mounted on the wall surface, the wall decorative element comprising:

a decorative elongated portion having a decorative first end, a decorative second end and a decorative longitudinal axis separating the decorative first end and the decorative second end, the decorative elongated portion having a lower edge extending between the decorative first end and the decorative second end capable of interfacing with the floor surface; and the decorative element mating connector to be releasably connected to the surface mounting element mating connector of the wall surface mounting element;

wherein when the wall decorative element is releasably mounted on the wall surface mounting element fixedly mounted on the wall surface, at least a portion of the decorative elongated portion of the wall decorative element interfaces with the wall surface; and further wherein the surface mounting element mating connector of the wall surface mounting element and the decorative element mating connector of the wall decorative element extend perpendicularly along the longitudinal axis and the decorative longitudinal axis respectively for allowing a releasable connection between the mounting element mating connector and the decorative element mating connector in a direction perpendicular to the longitudinal axis of the elongated portion and the decorative longitudinal axis of the decorative elongated portion, and parallel to the wall surface.

8. The molding decorative assembly kit of claim 7, wherein the wall decorative element further comprises a first fastener at the first end and a second fastener at the second end for releasably engaging with corresponding fasteners on adjacent wall decorative elements.

9. The molding decorative assembly kit of claim 7, further comprising a wall decorative adjustment element to be releasably connected to the wall decorative element to be releasably mounted on the wall surface mounting element, wherein the wall decorative element further comprises another decorative element mating connector releasably connected to a corresponding adjustment decorative element mating connector of the wall decorative adjustment element.

10. The molding decorative assembly kit of claim 9, wherein the wall decorative adjustment element further comprises a first fastener at a first end of the wall decorative adjustment element and a second fastener at a second end of the wall decorative adjustment element, wherein the releasably engaging with corresponding fasteners on adjacent wall decorative adjustment elements.

* * * * *